Dec. 10, 1968  G. HIRS ET AL  3,415,485
ASPIRATED VALVE FOR HANDLING PARTICULATE MATERIAL
Filed Dec. 28, 1966  3 Sheets-Sheet 1

INVENTORS
Gene Hirs
BY Arthur C. Schouw

WILSON, SETTLE, BATCHELDER
ATT'YS. & CRAIG.

INVENTORS
Gene Hirs
BY Arthur C. Schouw
WILSON, SETTLE, BATCHELDER
ATT'YS. & CRAIG.

INVENTORS
Gene Hirs
Arthur C. Schouw
BY
WILSON, SETTLE, BATCHELDER
ATT'YS. & CRAIG.

3,415,485
ASPIRATED VALVE FOR HANDLING
PARTICULATE MATERIAL
Gene Hirs, Birmingham, Mich., and Arthur C. Schouw, Corunna, Mich., assignors to Hydromation Engineering Company, Livonia, Mich.
Filed Dec. 28, 1966, Ser. No. 605,427
14 Claims. (Cl. 251—5)

This invention relates to valves, and more particularly to an aspirated valve for handling particulate material.

In some material handling applications it is necessary to pass particulate material through a valve, and the valve must be operable to open or close while it is loaded with particulate material. Sometimes the particulate material is quite abrasive, and the valve is subjected to abrasive action which causes wear of its parts. One application for this type is the valve of a dust collector through which the collected dust is discharged. It has been proposed that a standard butterfly valve be utilized at the dust discharging outlet of dust collectors. In such valves, it is necessary to move a disk into engagement with a rubber insert. The rubber is squeezed and pinched as the disk is wedged into the rubber, and there is considerable friction and wear. In some applications, such as chemical processes and food processes, it would be very desirable to have a valve wherein there is absolutely no wear and no abrasion of the product being dispensed.

The present invention provides a valve which has no mechanisms nor moving parts which are subject to wear in the operation of the valve. A preferred embodiment of the valve comprises a flexible tube which has permanent folds extending longitudinally from one end of the tube. The edge of the tube at the folded end has a "normal" closed condition wherein portions of that edge abut each other and close off the end of the tube. This same edge has an "actuated" open condition wherein the edge portions are spread apart to open the end of the tube. Opening and closing of the tube is effected by means of diaphragms which are sealed to the portions of the tube between the folds to provide pockets which can be inflated to close the tube and deflated to open the tube.

Supplementary to the action of the pockets, a biasing tube or collar may be provided which surrounds the folded end of the main tube and normally urges the edge of the main tube to its open condition. The biasing tube may yield when the pockets are inflated to allow the edge portions thereof to close, or the biasing tube may be rigid.

The pocket portions of the tube will sometimes be referred to as "cusps" hereinafter. The cusps of the valve as described above are integral portions of a flexible tube. However, it is apparent that separate cusp members could be joined together to provide a tubular valve body, and the invention embraces this modification. The valve may have two or three cusps, or some other number of cusps if desired. Other modifications of the valve within the scope of the invention will be apparent to those skilled in the art.

It is an object of the present invention to provide a valve with no moving parts subject to wear.

Another object of the invention is to provide a valve having pockets which may be inflated to close the valve and deflated to open the valve.

A further object of the invention is to provide a valve with inflatable pockets which open and close one end of a flexible tube which is the main body of the valve.

Another object of the invention is to provide a flexible tube with folds at one end thereof and with diaphragms sealed peripherally thereof to portions of the tube between the folds so that the end of the tube may be opened and closed by deflating and inflating pockets formed by the diaphragms and underlying portions of the tube.

A further object of the invention is to provide diaphragm seals which overlap the tube seals in a manner which assures that no bubble or other imperfection exists at the closed end of the tube when the pockets are inflated.

Another object of the invention is to aid the opening and closing of the end of the tube by means of a collar or supplementary tube which biases the end of the main tube.

Other objects of this invention will appear in the following description and appended claims, reference being had to accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not limitation.

Figure 1:
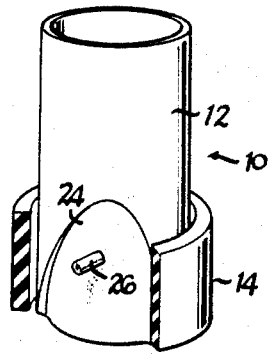
FIGURE 1 is a perspective view, partly cut away, of a two-cusp valve in accordance with one embodiment of the invention.
Figure 3:
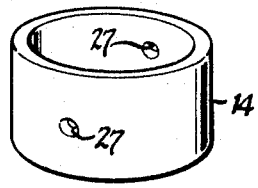
FIGURE 3 is a perspective view of a supplementary tube provided in the valve of FIGURE 1.

As shown on the drawings:

Referring first to FIGURE 1, a valve 10 is shown which includes a main flexible tube 12 and a supplementary tube or collar 14 which encircles the bottom end portion of the main tube 12. The main tube 12 is shown in elevation in FIGURE 2, and the supplementary tube 14 is shown in FIGURE 3. The valve 10 is designed especially for handling particulate material which enters the top end of the valve. The valve may be made entirely of rubber material or neoprene or some other suitable flexible polymer material. The main tube 12 of the valve has two permanent folds at 16 and 17 which extend upward in FIGURE 2 from the bottom end 18 of the valve. The folds 16 and 17 may be vulcanized to the extent indicated by the dashed lines 19 and 20 so that the folded portions having a fairly narrow width. Between the folds 16 and 17 there is a pocket portion or cusp which includes a portion 22 of the bottom edge 18 of the valve.

Attached to the pocket portion of the tube 12 is a flexible diaphragm 24. The diaphragm 24 is generally semi-elliptical in shape and is sealed as by vulcanizing all around its edges to the pocket portion of the tube 12 which lies between the folds 16 and 17. The diaphragm 24 and the underlying pocket portion of tube 12 together form a pocket which can be inflated and deflated to close and open the valve respectively.

Figure 2:
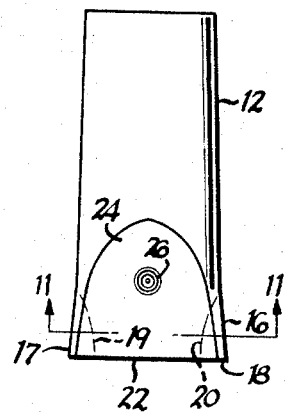
FIGURE 2 is an elevational view of the main tube of the valve of FIGURE 1.

Note that the diaphragm 24 overlaps the folds 16 and 17. This overlap is important to prevent wrinkling of edge 18. Although only one diaphragm 24 is shown in FIGURES 1 and 2, it will be understood that there is an identical diaphragm 24 on the back side of the tube 12 which is not visible in FIGURES 1 and 2. Each of these diaphragms 24 has a valve stem 26 extending through it of the type found on inner tubes and other pneumatic members through which air is introduced into the pockets underlying the diaphragms 24. The valve stems 26 extend through opening 27 in supplementary tube 14. Both diaphragms 24 and both valve stems 26 are visible in FIGURES 4 and 5.

Figure 4:
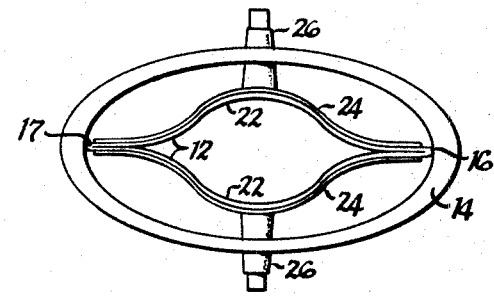
FIGURE 4 shows the bottom end of the valve of FIGURE 1 in an open end condition.
Figure 5:
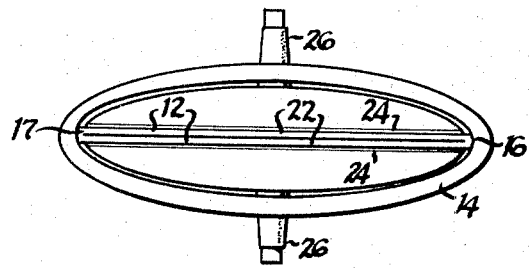
FIGURE 5 shows the bottom end of the valve of FIGURE 1 in a closed condition.

FIGURES 4 and 5 are bottom plan views of the valve 10, and the valve is shown in an open condition in FIGURE 4 and in a closed condition in FIGURE 5. In FIGURE 4 it is apparent that the edge portions 22 of tube 12 which lie between the folds 16 and 17 are spread apart so as to open the bottom end of the tube 12. This spreading apart of edge portions 22 is aided by the biasing action of the supplementary tube or collar 14. The tube 14 may be flexible and normally has the shape of a cylinder, but when the tube 14 is fitted over the end of the main tube 12 it assumes an elliptical shape as shown in FIGURE 4. The tube 14 tends to return to its circular shape, and in doing so, it pushes the folds 16 and 17 towards each other so as to spread the edge portions 22 of the tube 12 apart. Tube 14 could be made more rigid if desired.

When air is introduced into the pockets formed by diaphragms 24 and the underlying pocket portions of the tube 12, the edge portions 22 of tube 12 are pressed together so as to close the bottom end of the tube 12. The valve is shown in this closed condition in FIGURE 5. Air may be introduced into the pockets through the valve stems 26 which extend through the diaphragms 24. When the edge portions 22 abut each other as shown in FIGURE 5, the folds 16 and 17 are pushed outwardly such that the supplementary tube 14 is stretched into flatter elliptical shape. The tube 14 yields to allow the edge portions 22 to be closed.

Figure 11:
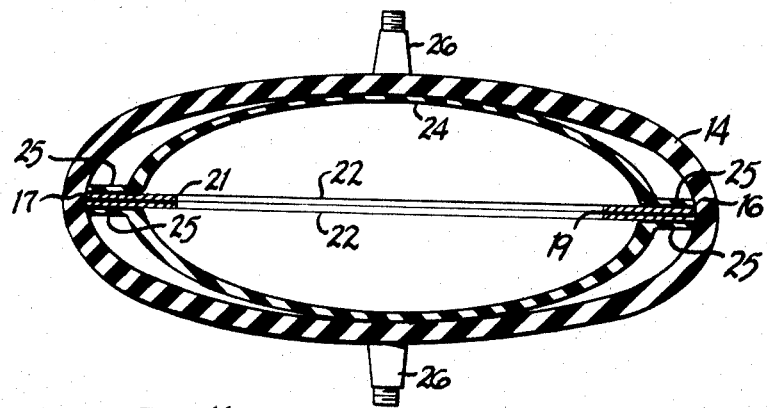
FIGURE 11 is a sectional view taken along line 11—11 in FIGURE 2.

FIGURE 11 is an enlarged sectional view of the valve in its inflated condition. This view shows in particular how the seal around the edges of the diaphragms 24 overlap the seals at the folded portions 16 and 17 of the tube 12. The seals are indicated by heavy lines in FIGURE 11. It may be seen that folds 16 and 17 are sealed from the outer ends thereof up to points 19 and 21, respectively. However, the seals bonding the edge portions 25 of diaphragms 24 extend from the outer ends thereof only about half of the distance to points 19 and 21. Thus, with the pockets inflated as shown in FIGURE 11, air pressure acts on the inner portions of the fold seals adjacent to points 19 and 21 and assures that no bubble or other imperfection forms between edges 22 at points 19 and 21.

Figure 12:
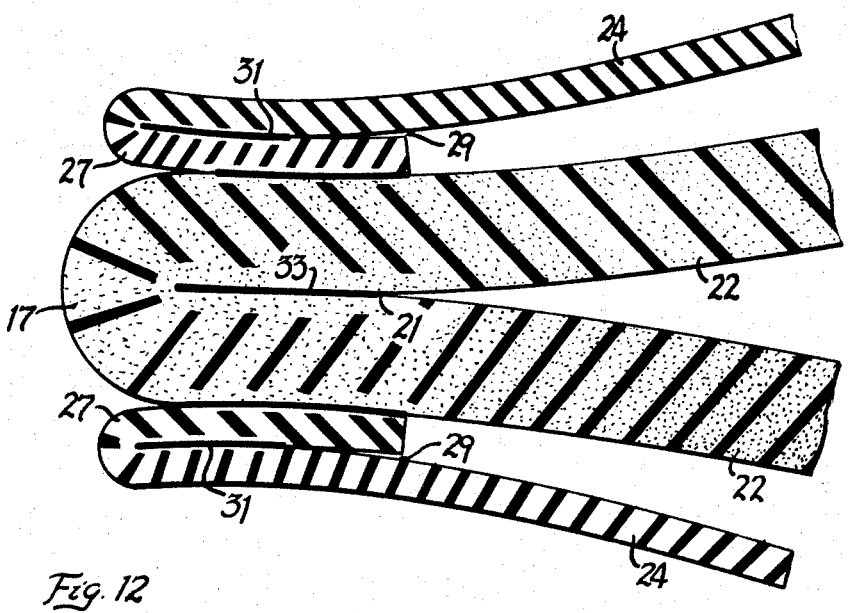
FIGURE 12 is a fragmentary sectional view showing certain seals.

FIGURE 12 shows on an enlarged scale a slight modification of the seals between the diaphragms 24 and the tube 12. The pockets are deflated in this fragmentary view, and the edges 22 are therefore spread apart. The diaphragms 24 have each been folded back under to provide tongue portions 27 which are sealed as by vulcanizing to the adjoining portions of tube 12. The tongue portions 27 are also sealed at 31 to the main parts of the diaphragms 24. It may be seen that the seals at 31 are not as long as the seal 33 which extends between fold end 17 and point 21, and consequently, when the diaphragms are inflated, air pressure will act in the space at 29 tending to push tube edges 22 together. This again makes sure that no bubble or other imperfection exists between edges 22 at point 21 when the pockets are inflated.

Figure 6:
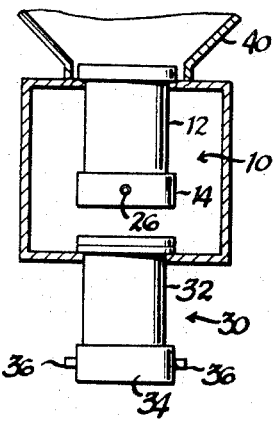
FIGURE 6 shows two valves supported one above the other in an air-lock type of discharge outlet.

In FIGURE 6, two valves 10 and 30 are shown suspended below a discharge outlet 40 such as might be found at the discharge outlet of a dust collector. Valve 30 is offset angularly 90° from valve 10 as shown. Dust or other particles are discharged from the opening 40 into the tube 12 of valve 10 and these particles build up in the tube so long as the bottom end of tube 12 within supplementary tube 14 remains closed. Valve 30 is also normally closed. When enough particulate material has collected in the valve 10, valve 10 is opened to discharge the particles into the lower valve 30. Valve 10 is then closed again by inflating the pockets of the valve as previously described. Valve 30 may then be opened to discharge the particles into some sort of collecting receptacle (not shown). When the discharging is complete, valve 30 is also closed again.

Valve 30 is closed by introducing air into its pockets through the valve stem 36, the valve stems and pockets being identical to the valve stems 26 and the pockets formed by diaphragms 24 of valve 10 as previously described. Opening of valve 30 is accomplished by deflating its pockets, and opening is aided by the biasing action of the supplementary tube 34 which is identical to supplementary tube 14 of valve 10.

Figure 7:
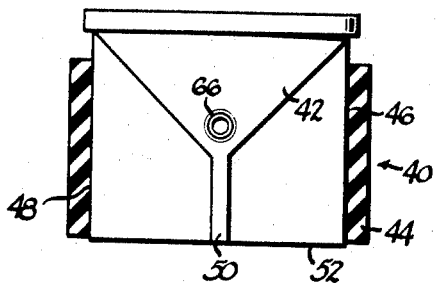
FIGURE 7 is an elevational view, partly in section, of a three-cusp valve forming another embodiment of the invention.
Figure 8:
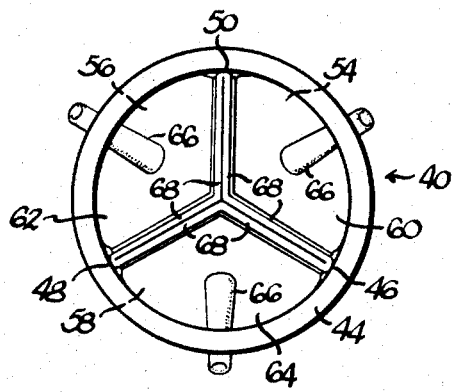
FIGURE 8 is a bottom plan view of the three-cusp valve of FIGURE 7.
Figure 9:
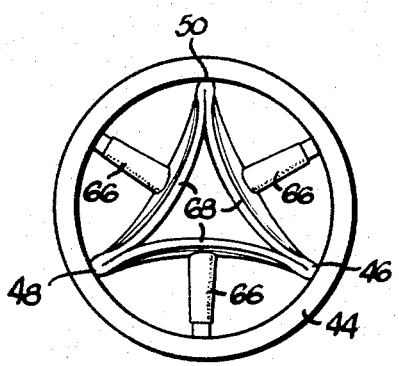
FIGURE 9 shows the bottom of the three-cusp valve in an open condition.

FIGURES 7, 8 and 9 show a three-cusp valve in accordance with another embodiment of the invention. The valve 40 is made from a flexible tube 42 of rubber, neoprene or other suitable flexible material just as in the case of the valve 10 of FIGURES 1 through 6. In addition to the tube 42, there may be a supplementary tube 44 which encircles the bottom end of tube 42 to provide a biasing action similar to that described in connection with FIGURES 4 and 5. The supplementary tube 44 may not be essential for all applications of the tri-cusp valve 40.

The tube 42 has three folds 46, 48 and 50 as shown in FIGURE 8. The folds extend upward from the bottom end 52 of the tube 42 as shown in FIGURE 7. The folds are vulcanized so that the two sides of each fold hold together. Between the folds 46, 48 and 50 there are three pocket portions or cusps 54, 56 and 58. Affixed to the pocket portions or cusps are three diaphragms 60, 62 and 64 which are sealed all around their edges so as to form pockets between the folds 46, 48 and 50. The diaphragms overlap the folds 46, 48 and 50 to prevent wrinkling of bottom edge 52. Each pocket has a valve stem 66 for introducing air into and removing air from pockets.

It may be seen in FIGURE 8 that portions 68 of the bottom edge of the tube 42 abut each other so as to close the bottom end of the tube. These edge portions 68 assume this closed position when the pockets underlying diaphragms 60, 62 and 64 are inflated. When the pockets are deflated, the edge portions 68 open up so as to provide an opening through the bottom of the valve as shown in FIGURE 9. When the pockets are deflated, the flexible supplementary tube 44 tends to push the folds 46, 48 and 50 toward the center of the valve, and this in turn causes the edge portions 68 to separate from each other to open the bottom end of the valve. When the pockets of the valve are inflated by introducing air through valve stems 66, the edge portions 68 are pressed against each other again to close the bottom of the valve.

Figure 10:
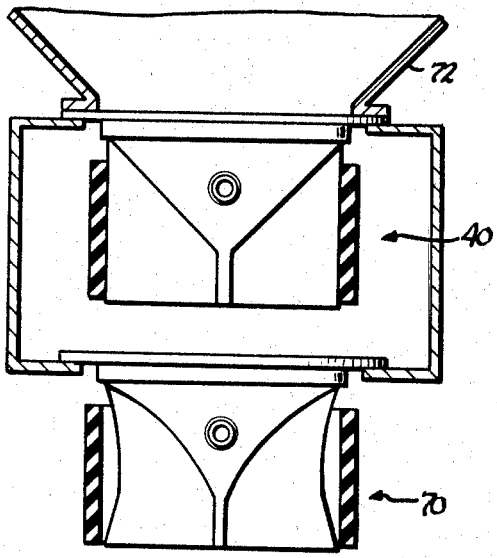
FIGURE 10 shows two of the three-cusp valves mounted one above the other at a discharge outlet.

FIGURE 10 shows two tri-cusp valves 40 and 70 positioned beneath the discharge outlet 72 of an apparatus such as a dust collector. Both valves 40 and 70 are normally closed. Dust or other particulate material collects in the upper valve 40, and when a predetermined amount of particles collect in the valve 40, it is opened to discharge the particles into the lower valve 70. Valve 40 is then closed, and valve 70 may be opened to discharge the particles into a suitable collector (not shown). Valve 70 is shown in an open condition in FIGURE 10.

Valve 70 then is again closed to return these valves to their original condition.

It is evident from the foregoing description that the invention provides a valve which has no wiping or sliding surfaces and no moving mechanical parts subject to wear. The valve is easy to construct in either the two-cusp or in the three-cusp embodiments and is reliable in operation and has a long service life.

I claim:

1. A valve comprising a tube of flexible material having permanent folds therein extending longitudinally of said tube from one end thereof, the edge of said tube at said one end thereof having a closed condition wherein portions of said edge abut each other to close said one end of said tube, and said edge having an open condition wherein said edge portions are spread apart to open said one end of said tube, said tube having pocket portions between said folds each including one of said edge portions of said tube, a plurality of flexible diaphragms each sealed all around the edges thereof to a respective one of said pocket portions of said tube to form pockets which can be inflated to close said edge portions of said tube and deflated to open said edge portions, and means for introducing gas into and removing gas from said pockets.

2. The valve of claim 1 further including a collar surrounding said one end of said tube, said collar urging said edge of said one end of said tube to said open condition but allowing said edge portions to close when said pockets are inflated.

3. The valve of claim 1 in which said tube has two permanent folds and two pockets.

4. The valve of claim 1 in which said tube has three permanent folds and three pockets.

5. The valve of claim 1 in which said tube and said diaphragms are made of a polymer, said tube being vulcanized at said folds to make said folds permanent.

6. The valve of claim 5 in which the seal between said diaphragms and said pocket portions is vulcanized.

7. A valve comprising a plurality of cusp members made of flexible material having free edges which abut each other in a closed position of said valve, said valve having an open position in which said edges are spread apart to define an opening through said valve, said cusp members having further portions joined together to form a circular mouth for said valve spaced from said free edges, and a plurality of diaphragms of flexible material each comprising a sheet of said material sealed all around the edges thereof to said cusps to provide pockets which can be inflated to close said valve and deflated to open the same.

8. The valve of claim 7 in which said cusp members are integral with each other.

9. A valve comprising a plurality of flexible cusp members joined together to form a tubular valve body having a free edge at one end thereof, said free edge having a closed condition wherein portions of said edge abut each other to close said one end of said valve body, and said free edge having an open condition wherein said edge portions are spread apart to open said one end of said tubular valve body, said tubular valve body having pocket portions between the joined portions of said cusp members each including one of said free edge portions, a plurality of flexible diaphragms each sealed all around the edges thereof to a corresponding one of said pocket portions to form pockets which can be inflated to close said free edge portions of said tube and deflated to open said free edge portions, and means for introducing air into and removing air from said pockets.

10. The valve as claimed in claim 9 in which the joined portions of said cusp members are permanently sealed together with the seals extending inwardly of said tubular body a predetermined distance, and in which said sealed edges of said diaphragms overlap the sealed portions of said tubular valve body but extend inwardly of said tubular body a distance less than said predetermined distance so that gas pressure in said pockets can press together an inner part of said joined portions of said cusp members.

11. The valve as claimed in claim 10 in which said diaphragms each have a folded under tongue at the edge thereof, said tongues being sealed to said cusp members and the edges of said diaphragms being sealed to said tongues, the latter seals extending inwardly of said tubular body a distance less than said predetermined distance.

12. A valve comprising a tube of flexible material having permanent folds therein extending longitudinally of said tube from one end thereof and also extending inwardly of said tube a predetermined distance, the folded portions of said tube being permanently sealed together, the edge of said tube at said one end thereof having a closed condition wherein portions of said edge abut each other to close said one end of said tube, and said edge having an open condition wherein said edge portions are spread apart to open said one end of said tube, said tube having pocket portions between said folds each including one of said edge portions of said tube, a plurality of flexible diaphragms each sealed all around the edges thereof to a respective one of said pocket portions of said tube to form pockets which can be inflated to close said edge portions of said tube and deflated to open said edge portions, said sealed edges of said diaphragms overlapping the sealed folds of said tube but extending inwardly of said tube a distance less than said predetermined distance so that gas pressure in said pockets can press together an inner portion of said sealed folds, and means for introducing gas into and removing gas from said pockets.

13. The valve as claimed in claim 12 in which said diaphragms each have a folded under tongue at the edge thereof, said tongue being sealed to said tube and the edges of said diaphragms being sealed to said tongues, the latter seals extending inwardly of said tube a distance less than said predetermined distance.

14. A valve as claimed in claim 12 in which said valve further includes a collar surrounding said one end of said tube, said collar urging said edge of said one end of said tube to an open condition but allowing said edge portions to close when said pockets are inflated.

References Cited

UNITED STATES PATENTS

| | | | |
|---|---|---|---|
| 2,633,154 | 3/1953 | Eastman | 251—5 |
| 2,750,959 | 6/1956 | Seggern | 251—5 X |
| 2,982,511 | 5/1961 | Connor | 251—5 |
| 3,017,903 | 1/1962 | Steffens | 251—5 X |
| 3,039,733 | 6/1962 | Mattioli | 251—5 |

STANLEY N. GILREATH, *Primary Examiner.*

U.S. Cl. X.R.

137—525; 222—504